United States Patent
Ishihara

Patent Number: 6,028,730
Date of Patent: Feb. 22, 2000

[54] METHOD AND APPARATUS FOR INITIALIZING A MAGNETORESISTIVE HEAD

[75] Inventor: Kunihiko Ishihara, Tokyo, Japan

[73] Assignee: NEC Corporation, Tokyo, Japan

[21] Appl. No.: 09/012,055

[22] Filed: Jan. 22, 1998

[30] Foreign Application Priority Data

Jan. 22, 1997 [JP] Japan .................................. 9-009656

[51] Int. Cl.[7] .............................. G11B 5/39; G11B 5/455
[52] U.S. Cl. ................... 360/66; 360/75; 360/113
[58] Field of Search ............... 360/66, 113, 75; 324/252, 207.21; 338/32 R

[56] References Cited

U.S. PATENT DOCUMENTS

| | | | |
|---|---|---|---|
| 5,398,146 | 3/1995 | Draaisma | 360/128 |
| 5,528,440 | 6/1996 | Fontana et al. | 360/113 |
| 5,650,887 | 7/1997 | Dovek et al. | 360/113 |
| 5,677,625 | 10/1997 | Dieny | 360/113 |
| 5,684,658 | 11/1997 | Shi et al. | 360/113 |
| 5,748,399 | 5/1998 | Gill | 360/113 |

FOREIGN PATENT DOCUMENTS

| | | |
|---|---|---|
| 261572 | 3/1990 | Japan . |
| 4358310 | 12/1992 | Japan . |

*Primary Examiner*—David L. Ometz
*Attorney, Agent, or Firm*—Hayes Soloway Hennessey Grossman & Hage PC

[57] ABSTRACT

The present invention provides a device for supplying an initialization pulse current to at least laminations of a pinned ferromagnetic layer, a non-magnetic metal layer and a free ferromagnetic layer in a magnetoresistive transducer in an initialization pulse current direction which is perpendicular to a predetermined magnetization direction of the pinned ferromagnetic layer and also parallel to an interface between the pinned ferromagnetic layer and the non-magnetic metal layer, wherein the device is electrically connected to opposite ends of the laminations spaced from each other in the initialization current direction for applying a pulse voltage between the opposite ends so as to flow the initialization pulse current in the initialization pulse current direction through the laminations.

7 Claims, 6 Drawing Sheets

METHOD AND APPARATUS FOR INITIALIZING A MAGNETORESISTIVE HEAD

BACKGROUND OF THE INVENTION

The present invention relates to an improved magnetoresistive head and a method and an apparatus for initializing the same, and more particularly to an improved magnetoresistive head being improved in a high reproduced output and operational stability, and being used for storing information into a magnetic recording medium and reproducing the stored information, wherein the information is stored as a direction of magnetization of the magnetic medium.

Recently, a sensitivity of the magnetic sensor and a high density of the magnetic recording have underscored the importance of the developments of the magnetoresistive sensor and the magnetoresistive head.

The magnetoresistive sensor and the magnetoresistive head operate by reading out external magnetic field signals based upon variations in resistance of the sensor or detector portion made of a magnetic material. Since a relative speed of the head to the magnetic medium does not depend upon the reproduced output, the magnetoresistive sensor can show a high sensitivity whilst the magnetoresistive head can have a high output even at a high density magnetic recording.

In Physical Review Letters vol. 61, p. 2472, 1988, it is disclosed that a magnetoresistive effect due to a spin dependent scattering can be observed in multilayer in the form of a magnetic synthetic lattice.

The above magnetoresistive effect is a giant magnetoresistive effect, much larger than the conventional magnetoresistive effect.

In the Japanese laid-open patent publication. No. 2-61572, it is disclosed that the magnetoresistive effect is caused due to the spin dependent scattering. A magnetic sensor has at least two ferromagnetic layers separated by an intermediate layer. Those layers are made of materials such that the electron scattering depending upon the spin direction is caused on the boundary interfaces.

In Physical Review B vol. 43, p. 1297, 1991 and Japanese laid-open patent publication No. 4-358310, it is disclosed that at least two ferromagnetic layers are separated by a non-magnetic metal layer and further an anti-ferromagnetic layer is provided adjacent to one of the two ferromagnetic layers so that the magnetization direction of the one ferromagnetic layer is pinned, whilst the magnetization direction of the other ferromagnetic layer is free to rotate in accordance with an externally applied magnetic field for causing a large variation in resistance thereof. This structure is a spin valve structure which shows a giant magnetoresistive effect.

Figure 1:
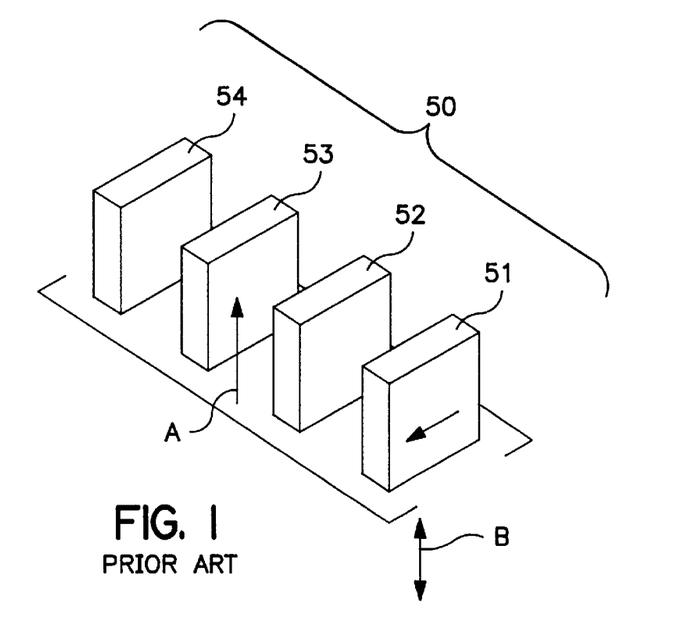
FIG. 1 is a schematic view illustrative of one of the conventional magnetic heads utilizing the giant magnetoresistive effect.

FIG. 1 is a schematic view illustrative of one of the conventional magnetic heads utilizing the giant magnetoresistive effect. A magnetic sensing portion 50 is provided for sensing magnetic signals. The magnetic sensing portion 50 comprises a pair of first and second ferromagnetic layers 51 and 53 separated by a non-magnetic metal layer 52 and an anti-ferromagnetic layer 54 adjacent to the second ferromagnetic layer 53. The anti-ferromagnetic layer 54 provides an exchange coupling which pins the magnetization of the second ferromagnetic layer 53 in a direction "A". The second ferromagnetic layer 53 serves as a pinned layer wherein the magnetization is pinned. The first ferromagnetic layer 51 is a free layer wherein the magnetization is free to rotate. If the magnetization of the second ferromagnetic layer 53 is pinned in the direction "A" which is parallel to a direction "B" of the magnetic field signal externally applied whilst the magnetization direction of the first ferromagnetic layer 51 serving as the free layer is perpendicular to the direction "B" of the signal magnetic field, then a large linear response and a wide dynamic range are obtained. The magnetization of the first ferromagnetic layer 51 is free to rotate whilst the magnetization of the second ferromagnetic layer 53 is pinned, whereby an angle between the magnetization directions of the first and second ferromagnetic layers 51 and 53 is varied. This variation in angle between the magnetization directions of the first and second ferromagnetic layers 51 and 53 causes a variation in resistance of the magnetic sensing portion 50. This variation in resistance of the magnetic sensing portion 50 is detected.

Not illustrated in FIG. 1, a permanent magnetic layer or an anti-ferromagnetic layer is provided at edge portions of the above layers for generating a longitudinal bias magnetic field which causes a single domain of magnetization of the first ferromagnetic layer 51.

Figure 2:
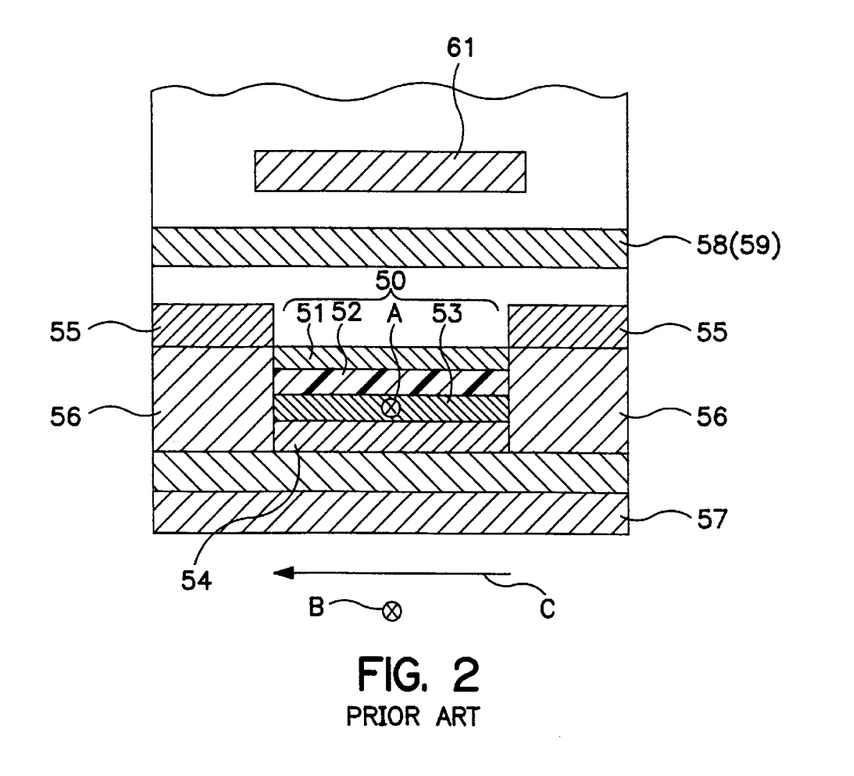
FIG. 2 is a fragmentary cross sectional elevation view illustrative of the conventional magnetic head comprising an inductive portion for magnetic recording and a magnetic sensing portion utilizing the giant magnetoresistive effect for reproducing signals.

The above conventional magnetic head utilizing the giant magnetoresistive effect has the following problems. The first problem is that the magnetization of the second ferromagnetic layer 53 is pinned in a direction which is parallel to the signal magnetic field but which is perpendicular to magnetization directions of the magnetic layers forming the magnetic head. FIG. 2 is a fragmentary cross sectional elevation view illustrative of the conventional magnetic head comprising an inductive portion for magnetic recording and a magnetic sensing portion utilizing the giant magnetoresistive effect for reproducing signals. The conventional magnetic head has a magnetic sensing portion 50 exhibiting the giant magnetoresistive effect. The conventional magnetic head also has a pair of top and bottom shields 58 and 57 for improvement in density of magnetic recording in a bit direction. The conventional magnetic head also has a pair of top and bottom poles 61 and 59 for recording signals into a magnetic medium. The conventional magnetic head also has a permanent magnet 56 for causing a stable single domain of magnetization of the first ferromagnetic layer 51. The top shield 58 serves not only the shield layer but also the bottom pole 59.

In the high frequency range, it is necessary for recording signals into the magnetic medium or reproducing the signals that the easy axes of the top and bottom shields and the top and bottom poles are perpendicular to the direction "B" of the magnetic field signal. Those magnetic layers are grown or heat-treated under application of the magnetic field for control of the magnetic anisotropy so that the magnetic layers have desired easy axes orientation.

The permanent magnet layer 56 is provided for causing the stable single domain of magnetization of the first ferromagnetic layer 51. The magnetic anisotropy of the permanent magnet layer 56 is directed perpendicular to the direction "B" of the magnetic field signal.

As described above, the easy axis of the top and bottom shields 58 and 57 is perpendicular to the direction "B" of the signal magnetic field. The easy axis of the top and bottom poles 61 and 59 is also perpendicular to the direction "B" of the signal magnetic field. The magnetization direction of the permanent magnet layer 56 is also perpendicular to the direction "B" of the signal magnetic field. On the other hand, it is required that the magnetization direction "A" of the second ferromagnetic layer 53 be pinned in the direction parallel to the direction "B" of the signal magnetic field.

In order to pin the magnetization of the second ferromagnetic layer 53 by use of the anti-ferromagnetic layer, it is required to rise the temperature up to a Neel temperature of a film on growth or the anti-ferromagnetic layer under the magnetic field for polarization.

If, however, the above temperature rising process is carried out during the growth of the films having the giant magnetoresistive effect, then it is possible that the easy axis of the bottom shield 57 is disturbed and further that the pining of the magnetization of the second ferromagnetic layer 53 is disturbed in the control processes for the magnetic anisotropy of the top shield 58, and the top and bottom poles 61 and 59 after the layers having the giant magnetoresistive effect have been grown.

On the other hand, if the temperature rising process for pinning the magnetization of the second ferromagnetic layer 53 and subsequent polarization process are carried out after all of the layers forming the magnetic head have been grown, then undesired influences are provided onto the easy axes and magnetic properties of the top and bottom shields 58 and 57, the top and bottom poles 61 and 59 and the permanent magnet layer 56 and the other layers forming the magnetic head.

Further, it is possible that, during the processes of the magnetic head, the magnetic properties of the magnetic material of the magnetic head are varied. Since the second ferromagnetic layer 53 is different in magnetization direction from the other magnetic layers, it is very difficult to carry out an initial setting again in the final state of the magnetic head.

The second problem with the magnetic head utilizing the giant magnetoresistive effect is that a magnetic field is caused by a detection current flowing through the magnetoresistive films so as to weaken the pinned magnetization of the second ferromagnetic layer 53.

As illustrated in FIG. 2, a pair of electrodes 55 are provided for applying a detection current to the magnetoresistive films for detecting signal magnetic fields. The symmetry of the reproduced signal waveforms largely depends upon the direction of the detection current. Since the magnetization of the second ferromagnetic layer 53 is pinned by the anti-ferromagnetic layer 54, a static magnetic coupling is generated between the first and second ferromagnetic layers 51 and 53 whereby the magnetization direction of the first ferromagnetic layer 51 is varied from a direction perpendicular to the direction "B" of the signal magnetic field. As a result, a dynamic range to the signal magnetic field is made narrow.

If the detection current is applied in such a direction "C" that the direction of the magnetic field generated in the first ferromagnetic layer 51 by the detection current is antiparallel to the direction of the static magnetic field of the second ferromagnetic layer 53 pinned by the anti-ferromagnetic layer 54 whereby the static magnetic field by the second ferromagnetic layer 53 is weakened to improve the symmetry of the reproduced signal waveform.

The magnetic field caused by the detection current weakens the pinning of the second ferromagnetic layer 53 whereby the magnetization of the second ferromagnetic layer 53 is gradually disturbed.

In the above circumstances, it had been required to develop a novel magnetic head utilizing a giant magnetoresistive effect and a method of initialization thereof free from the above problems.

SUMMARY OF THE INVENTION

Accordingly, it is an object of the present invention to provide a novel magnetic head utilizing a giant magnetoresistive effect free from the above problems.

It is further object of the present invention to provide a novel magnetic head utilizing a giant magnetoresistive effect, which is capable of initializing again the magnetization direction of the pinned ferromagnetic layer in a final state of the magnetic head without disturbance of the easy axes both of the top and bottom of the shields and of the top and bottom poles.

It is a still further object of the present invention to provide a novel method of initializing the magnetization direction of the pinned ferromagnetic layer in a final state of the magnetic head without disturbance of the easy axes both of the top and bottom of the shields and of the top and bottom poles.

The above and other objects, features and advantages of the present invention will be apparent from the following descriptions.

The first present invention provides a device for supplying an initialization pulse current to at least laminations of a pinned ferromagnetic layer, a non-magnetic metal layer and a free ferromagnetic layer in a magnetoresistive transducer in an initialization pulse current direction which is perpendicular to a predetermined magnetization direction of the pinned ferromagnetic layer and also parallel to an interface between the pinned ferromagnetic layer and the non-magnetic metal layer, wherein the device is electrically connected to opposite ends of the laminations spaced from each other in the initialization current direction for applying a pulse voltage between the opposite ends so as to flow the initialization pulse current in the initialization pulse current direction through the laminations.

BRIEF DESCRIPTION OF THE DRAWINGS

Preferred embodiments according to the present invention will be described in detail with reference to the accompanying drawings.

DETAILED DESCRIPTION OF PREFERRED EMBODIMENTS

Figure 3:
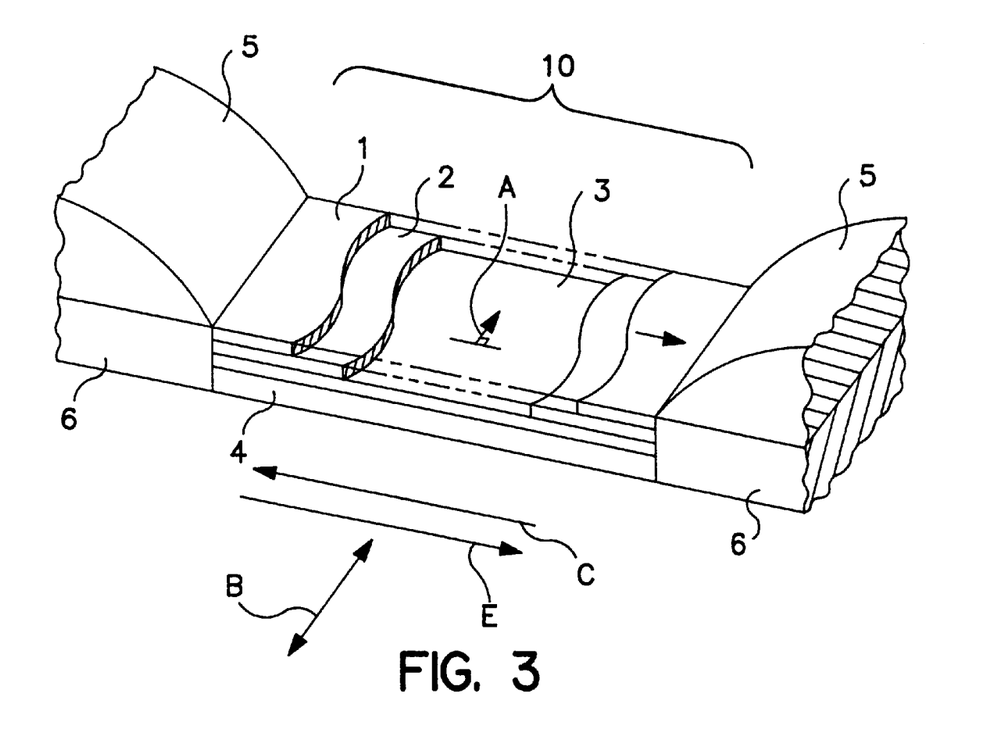
FIG. 3 is a fragmentary perspective view illustrative of a magnetic sensing portion of a magnetoresistive head utilizing a giant magnetoresistive effect in first to third embodiments according to the present invention.

The first present invention provides a device for supplying an initialization pulse current to at least laminations of a pinned ferromagnetic layer, a non-magnetic metal layer and a free ferromagnetic layer in a magnetoresistive transducer in an initialization pulse current direction which is perpendicular to a predetermined magnetization direction of the pinned ferromagnetic layer and also parallel to an interface between the pinned ferromagnetic layer and the non-magnetic metal layer, wherein the device is electrically connected to opposite ends of the laminations spaced from each other in the initialization current direction for applying a pulse voltage between the opposite ends so as to flow the initialization pulse current in the initialization pulse current direction through the laminations There are opposite directions of the initialization pulse current which are perpendicular to the predetermined magnetization direction of the pinned ferromagnetic layer and also parallel to an interface between the pinned ferromagnetic layer and the non-magnetic metal layer. Notwithstanding, one of the opposite directions of the initialization pulse current is available for initialization of the magnetization. The available direction of the initialization pulse current is determined on the basis of the predetermined direction of the magnetization of the pinned ferromagnetic layer in accordance with Biot-Savart Law. As illustrated in FIG. 3, the magnetization of the pinned layer 3 is pinned in a direction of "A" by an exchange coupling between the pinned ferromagnetic layer and the anti-ferromagnetic layer. Even if the magnetization of the pinned ferromagnetic layer 3 has once been disturbed or disordered, it is possible to initialize the magnetoresistive transducer by re-pinning or re-ordering the magnetization of the pinned ferromagnetic layer in the predetermined magnetization direction "A", for which purpose the initialization pulse current is applied in a direction "E" across the opposite sides of the laminations of the pinned ferromagnetic layer 3, the non-magnetic metal layer 2 and the free ferromagnetic magnetic layer 1, wherein the direction "E" is determined on the bases of the predetermined magnetization direction "A" of the pinned ferromagnetic layer 3 in accordance with the Biot-Savart Law. The magnetization direction "A" of the pinned ferromagnetic layer 3 is pre-determined based upon a direction "B" of signal magnetic fields externally applied to the magnetoresistive transducer.

The above anti-ferromagnetic layer 4 may be made of either an electrically insulating anti-ferromagnetic material or an electrically conductive anti-ferromagnetic material. If the anti-ferromagnetic layer 4 is made of an electrically insulating anti-ferromagnetic material, then the initialization pulse current flows through the laminations of the free ferromagnetic layer 1, the non-magnetic metal layer 2 and the pinned ferromagnetic layer 3. On the other hand, if the anti-ferromagnetic layer 4 is made of an electrically conductive anti-ferromagnetic material, then the initialization pulse current flows through the laminations of the free ferromagnetic layer 1, the non-magnetic metal layer 2, the pinned ferromagnetic layer 3 and the anti-ferromagnetic layer 4, provided that the current density of the anti-ferromagnetic layer 4 is lower than the other three layers 1, 2 and 3.

A detection current flows through the laminations of the free ferromagnetic layer 1, the non-magnetic metal layer 2, the pinned ferromagnetic layer 3 and the anti-ferromagnetic layer 4, if the anti-ferromagnetic layer 4 is made of an electrically conductive anti-ferromagnetic material. If, however, the anti-ferromagnetic layer 4 is made of an electrically insulating anti-ferromagnetic material, then the detection current flows through the free ferromagnetic layer 1, the non-magnetic metal layer 2 and the pinned ferromagnetic layer 3. It is essential that the detection current flows in any direction parallel to the interface of the laminations of the above layers. Notwithstanding, it is preferable that a direction "C" of the detection current is perpendicular to the magnetization direction "A" of the pinned ferromagnetic layer 3 and also anti-parallel to the direction "E" of the initialization pulse current so that the magnetization direction of the free ferromagnetic layer 1 is perpendicular to the direction "B" of the externally applied signal magnetic field whereby a linear responsibility characteristic with a wide dynamic range can be obtained. The application of the detection current in the direction "C" anti-parallel to the initialization pulse current direction "E" causes the weakening of the pinning of the magnetization of the pinned ferromagnetic layer 3. As a result, the magnetization direction of the pinned ferromagnetic layer is disturbed or disordered. However, the application of the initialization pulse current in the direction "E" anti-parallel to the direction "C" of the detection current causes application of a current magnetic field in the same direction as the direction "A" of the original and ideal magnetization direction of the pinned ferromagnetic layer 3. Here, it is important that the pulse voltage level of the initialization pulse current is higher than the voltage level of the detection current. This application of a current magnetic field in the same direction as the direction "A" causes the pinning of the magnetization to be strong whereby the disturbed and disordered magnetization direction of the pinned ferromagnetic layer 3 is again ordered. As a result, the initialization of the magnetoresistive transducer can be realized. When the initialization pulse current is applied in the direction "E" prior to the application of the detection current in the direction "C", then the stability of the performance of the magnetoresistive transducer is improved and a symmetrical and highly reproducible waveform can be obtained.

Further, the magnetization direction of the pinned ferromagnetic layer 3 may be disturbed or disordered in processes for the magnetoresistive transducer, for example, the magnetoresistive head. Even if the magnetization direction of the pinned ferromagnetic layer 3 has been disturbed or disordered, it is possible to again initialize the magnetoresistive transducer by applying in the direction "E" the initialization pulse current having the pulse voltage level which is higher than the voltage level of the detection current as described above.

It is preferable that a pulse duration of the applied initialization pulse voltage is set not more than 1 second in order to suppress undesired influences due to excess thermal generation.

It is further preferable that the pulse voltage level of the initialization pulse current is not less than three times as high as the voltage level of the detection current for applying a sufficiently high current magnetic field to the laminations of the above layers.

In the foregoing and hereinafter descriptions, the pulse voltage level means a maximum value of the pulse voltage waveform.

The device for applying the initialization pulse current between the opposite ends of the laminations of the free ferromagnetic layer 1, the non-magnetic metal layer 2 and the pinned ferromagnetic layer 3 may be realized in the following various configurations.

The device for applying the initialization pulse current may, for example, comprise a single pulse voltage generator for generating a pulse current serving as the initialization pulse current, a pair of terminals electrically connected to the opposite ends of the laminations, and a switch connected between the pulse voltage generator and each of the paired terminals, wherein the switch is operated to not only switch ON and OFF states of the pulse generator by connecting and disconnecting the pulse generator to and from the paired terminals but also switch directions of applications of the pulse current so that the device is capable of both a detection current and the initialization pulse current anti-parallel to the detection current by operations of the switch. In this case, the single pulse voltage generator is adjustable of a pulse voltage level so that the pulse voltage level of the initialization pulse current is not less than three times as high as the pulse voltage level of the detection current.

Alternatively, the device for applying the initialization pulse current may, for example, comprise an initialization pulse current generator and a detection current generator. The initialization pulse current generator is connected via a first ON/OFF switch to a pair of terminals electrically connected to the opposite ends of the laminations of the above layers for applying the pulse voltage between the opposite ends of the laminations to flow the initialization pulse current in the initialization pulse current direction through the laminations. The detection current generator is electrically connected via a second ON/OFF switch to the paired terminals for applying a voltage between the opposite ends of the laminations to flow a detection current in an anti-parallel direction to the initialization pulse current direction, wherein the first and second ON/OFF switches are operated not to take the ON state concurrently. In this case, the initialization pulse current generator is adjustable of a pulse voltage level of the initialization pulse current which is not less than three times as high as a pulse voltage level of the detection current adjusted by the detection current generator.

Further alternatively, the device may comprise an initialization pulse current generator and a detection current generator. The initialization pulse current generator is electrically connected via a first ON/OFF switch to a pair of terminals electrically connected to the opposite ends of the laminations for applying the pulse voltage between the opposite ends of the laminations to flow the initialization pulse current in the initialization pulse current direction through the laminations. The detection current generator is electrically connected via a second ON/OFF switch to other terminals electrically connected to other opposite ends of the laminations than the opposite ends thereof for applying a voltage between the other opposite ends of the laminations to flow a detection current between the other opposite ends of the laminations, wherein the first and second ON/OFF switches are operated not to take the ON state concurrently. In this case, the initialization pulse current generator is adjustable of a pulse voltage level of the initialization pulse current being not less than three times as high as a pulse voltage level of the detection current adjusted by the detection current generator.

The laminations include the anti-ferromagnetic layer 4 which is in contact with the pinned ferromagnetic layer and the anti-ferromagnetic layer is made of an insulation material so that the initialization pulse current flows through the individuals of the pinned ferromagnetic layer 3, the non-magnetic metal layer 2 and the free ferromagnetic layer 1.

Alternatively, the laminations include an anti-ferromagnetic layer which is in contact with the pinned ferromagnetic layer and the anti-ferromagnetic layer is made of a conductive material so that the initialization pulse current flows through the pinned ferromagnetic layer 3, the non-magnetic metal layer 2, the free ferromagnetic layer 1 and the anti-ferromagnetic layer 4.

The second present invention provides an apparatus which comprises a magnetoresistive transducer further comprising at least laminations of a pinned ferromagnetic layer, a non-magnetic metal layer and a free ferromagnetic layer for exhibiting a giant magnetoresistance effect, and a device electrically connected to the device for initialization of the magnetoresistive transducer by supplying an initialization pulse current to the magnetoresistive transducer in an initialization pulse current direction which is perpendicular to a predetermined magnetization direction of the pinned ferromagnetic layer and also parallel to an interface between the pinned ferromagnetic layer and the non-magnetic metal layer, wherein the device is electrically connected to opposite ends of the laminations spaced from each other in the initialization current direction for applying a pulse voltage between the opposite ends so as to flow the initialization pulse current in the initialization pulse current direction through the laminations.

There are opposite directions of the initialization pulse current which are perpendicular to the predetermined magnetization direction of the pinned ferromagnetic layer and also parallel to an interface between the pinned ferromagnetic layer and the non-magnetic metal layer. Notwithstanding, one of the opposite directions of the initialization pulse current is available for initialization of the magnetization. The available direction of the initialization pulse current is determined on the bases of the predetermined direction of the magnetization of the pinned ferromagnetic layer in accordance with Biot-Savart Law. As illustrated in FIG. 3, the magnetization of the pinned layer 3 is pinned in direction of "A" by an exchange coupling between the pinned ferromagnetic layer and the anti-ferromagnetic layer. Even if the magnetization of the pinned ferromagnetic layer 3 has once been disturbed or disordered, it is possible to initialize the magnetoresistive transducer by re-pinning or re-ordering the magnetization of the pinned ferromagnetic layer in the predetermined magnetization direction "A", for which purpose the initialization pulse current is applied in a direction "E" across the opposite sides of the laminations of the pinned ferromagnetic layer 3, the non-magnetic metal layer 2 and the free ferromagnetic magnetic layer 1, wherein the direction "E" is determined on the bases of the predetermined magnetization direction "A" of the pinned ferromagnetic layer 3 in accordance with the Biot-Savart Law. The magnetization direction "A" of the pinned ferromagnetic layer 3 is pre-determined based upon a direction "B" of signal magnetic fields externally applied to the ferromagnetic transducer.

The above anti-ferromagnetic layer 4 may be made of either an electrically insulating anti-ferromagnetic material or an electrically conductive anti-ferromagnetic material. If the anti-ferromagnetic layer 1 is made of an electrically insulating anti-ferromagnetic material, then the initialization pulse current flows through the laminations of the free ferromagnetic layer 1, the non-magnetic metal layer 2 and the pinned ferromagnetic layer 3. On the other hand, it the anti-ferromagnetic layer 4 is made of an electrically conductive anti-ferromagnetic material, then the initialization pulse current flows through the laminations of the free ferromagnetic layer 1, the non-magnetic metal layer 2, the pinned ferromagnetic layer 3 and the anti-ferromagnetic layer 4, provided that the current density of the anti-ferromagnetic layer 4 is lower than the other three layers 1, 2 and 3.

A detection current flows through the laminations of the free ferromagnetic layer 1, the non-magnetic metal layer 2, the pinned ferromagnetic layer 3 and the anti-ferromagnetic layer 4, if the anti-ferromagnetic layer 4 is made of an electrically conductive anti-ferromagnetic material. If, however, the anti-ferromagnetic layer 4 is made of an electrically insulating anti-ferromagnetic material, then the detection current flows through the free ferromagnetic layer 1, the non-magnetic metal layer 2 and the pinned ferromagnetic layer 3. It is essential that the detection current flows in any direction parallel to the interface of the laminations of the above layers. Notwithstanding, it is preferable that a direction "C" of the detection current is perpendicular to the magnetization direction "A" of the pinned ferromagnetic layer 3 and also anti-parallel to the direction "E" of the initialization pulse current so that the magnetization direction of the free ferromagnetic layer 1 is perpendicular to the direction "B" of the externally applied signal magnetic field whereby a linear responsibility characteristic with a wide dynamic range can be obtained. The application of the detection current in the direction "C" anti-parallel to the initialization pulse current direction "E" causes the weakening of the pinning of the magnetization of the pinned ferromagnetic layer 3. As a result, the magnetization direction of the pinned ferromagnetic layer is disturbed or disordered. However, the application of the initialization pulse current in the direction "E" anti-parallel to the direction "C" of the detection current causes application of a current magnetic field in the same direction as the direction "A" of the original and ideal magnetization direction of the pinned ferromagnetic layer 3. Here, it is important that the pulse voltage level of the initialization pulse current is higher than the voltage level of the detection current. This application of a current magnetic field in the same direction as the direction "A" causes the pinning of the magnetization to be strong whereby the disturbed and disordered magnetization direction of the pinned ferromagnetic layer 3 is again ordered. As a result, the initialization of the magnetoresistive transducer can be realized. When the initialization pulse current is applied in the direction "E" prior to the application of the detection current in the direction "C", then the stability of the performance of the magnetoresistive transducer and the symmetrical and high reproduced waveform can be obtained.

Further, the magnetization direction of the pinned ferromagnetic layer 3 may be disturbed or disordered in processes for the magnetoresistive transducer, for example, the magnetoresistive head. Even is the magnetization direction of the pinned ferromagnetic layer 3 has been disturbed or disordered, it is possible to again initialize the magnetoresistive transducer by applying in the direction "E" the initialization pulse current having the pulse voltage level which is higher than the voltage level of the detection current as described above.

It is preferable that a pulse duration of the applied initialization pulse voltage is set not more than 1 second in order to suppress undesired influences due to excess thermal generation.

It is further preferable that the pulse voltage level of the initialization pulse current is not less than three times as high as the voltage level of the detection current for applying a sufficiently high current magnetic field to the laminations of the above layers.

In the foregoing and hereinafter descriptions, the pulse voltage level means a maximum value of the pulse voltage waveform.

The device for applying the initialization pulse current between the opposite ends of the laminations of the free ferromagnetic layer 1, the non-magnetic metal layer 2 and the pinned ferromagnetic layer 3 may be realized in the following various configurations.

The device for applying the initialization pulse current may, for example, comprise a single pulse voltage generator for generating a pulse current serving as the initialization pulse current, a pair of terminals electrically connected to the opposite ends of the laminations, and a switch connected between the pulse voltage generator and each of the paired terminals, wherein the switch is operated to not only switch ON and OFF states of the pulse generator by connecting and disconnecting the pulse generator to and from the paired terminals but also switch directions of applications of the pulse current so that the device is capable of both a detection current and the initialization pulse current anti-parallel to the detection current by operations of the switch. In this case, the single pulse voltage generator is adjustable of a pulse voltage level so that the pulse voltage level of the initialization pulse current is not less than three times as high as the pulse voltage level of the detection current.

Alternatively, the device for applying the initialization pulse current may, for example, comprise an initialization pulse current generator and a detection current generator. The initialization pulse current generator is connected via a first ON/OFF switch to a pair of terminals electrically connected to the opposite ends of the laminations of the above layers for applying the pulse voltage between the opposite ends of the laminations to flow the initialization pulse current in the initialization pulse current direction through the laminations. The detection current generator is electrically connected via a second ON/OFF switch to the paired terminals for applying a voltage between the opposite ends of the laminations to flow a detection current in an anti-parallel direction to the initialization pulse current direction, wherein the first and second ON/OFF switched are operated not to take the ON state concurrently. In this case, the initialization pulse current generator is adjustable of a pulse voltage level of the initialization pulse current which is not less than three times as high as a pulse voltage level of the detection current adjusted by the detection current generator.

Further alternatively, the device may comprise an initialization pulse current generator and a detection current generator. The initialization pulse current generator is electrically connected via a first ON/OFF switch to a pair of terminals electrically connected to the opposite ends of the laminations for applying the pulse voltage between the opposite ends of the laminations to flow the initialization pulse current in the initialization pulse current direction through the laminations. The detection current generator is electrically connected via a second ON/OFF switch to other terminals electrically connected to other opposite ends of the laminations than the opposite ends there for applying a voltage between the other opposite ends of the laminations to flow a detection current between the other opposite ends of the laminations, wherein the first and second ON/OFF switches are operated not to take the ON state concurrently. In this case, the initialization pulse current generator is adjustable of a pulse voltage level of the initialization pulse current being not less than three times as high as a pulse voltage level of the detection current adjusted by the detection current generator.

The laminations include the anti-ferromagnetic layer 4 which is in contact with the pinned ferromagnetic layer and the anti-ferromagnetic layer is made of an insulation material so that the initialization pulse current flows through the individuals of the pinned ferromagnetic layer 3, the non-magnetic metal layer 2 and the free ferromagnetic layer 1. In this case, the insulating material of the anti-ferromagnetic layer 4 may be selected from the group consisting of nickel oxide, cobalt oxide and iron oxide.

Alternatively, the laminations include an anti-ferromagnetic layer which is in contact with the pinned ferromagnetic layer and the anti-ferromagnetic layer is made of a conductive material so that the initialization pulse current flows through the pinned ferromagnetic layer 3, the non-magnetic metal layer 2, the free ferromagnetic layer 1 and the anti-ferromagnetic layer 4. In this case, the conductive material of the anti-ferromagnetic layer 4 may be selected from the group consisting of FeMn, NiMn, PtMn, CrMn, and IrMn.

Furthermore, the pinned and free ferromagnetic layers 3 and 1 may be made of one selected from the group consisting of Fe, Co and Ni and alloys thereof.

Moreover, the non-magnetic metal layer may be made of Cu, Ag and Au and alloys thereof.

Still further, the magnetoresistive transducer may have an element for applying a longitudinal bias magnetic field which is capable of forcing the free ferromagnetic layer to be in a single domain state. In this case, the element for applying the longitudinal bias magnetic field may, for example, comprise a pair of permanent magnetic layers 6 provided with the opposite ends of the laminations of the free ferromagnetic layer 1, the non-magnetic metal layer 2, the pinned ferromagnetic layer 3 and the anti-ferromagnetic layer 4. Also a pair of terminals are electrically connected to the permanent magnetic layers for applying the pulse voltage between the opposite ends of the laminations to flow the initialization pulse current in the initialization pulse current direction through the laminations.

Alternatively, the element for applying the longitudinal bias magnetic field may comprise anti-ferromagnetic layers in contact with the free ferromagnetic layer in regions other than a magnetic sensing portion of the laminations.

The third present invention provides a method for initializing a magnetoresistive transducer by supplying an initialization pulse current to at least laminations of a pinned ferromagnetic layer, a non-magnetic metal layer and a free ferromagnetic layer in a magnetoresistive transducer in an initialization pulse current direction which is perpendicular to a predetermined magnetization direction of the pinned ferromagnetic layer and also parallel to an interface between the pinned ferromagnetic layer and the non-magnetic metal layer, wherein a pulse voltage is applied between opposite ends of the laminations so as to flow the initialization pulse current in the initialization pulse current direction through the laminations As described above, it is preferable that a pulse duration of the pulse voltage is set not more than 1 second.

It is also preferable that the initialization pulse current is applied periodically.

It is also preferable that the initialization pulse current is applied in a direction anti-parallel to a direction long which a detection current flows.

It is also preferable that the initialization pulse current is applied before a detection current is applied in a direction anti-parallel to a direction of the initialization pulse current.

It is also preferable that the initialization pulse current has a pulse voltage level which is higher than a voltage level of a detection current. In this case, the initialization pulse current may have a pulse voltage level which is not less than three times as high as a voltage level of a detection current.

PREFERRED EMBODIMENTS

First Embodiment

A first embodiment according to the present invention will be described in detail as follows, wherein the present invention is applied to a magnetoresistive head having a magnetic sensing portion as illustrated in FIG. 3. The magnetoresistive head comprises an inductive portion for magnetic recording and a magnetic sensing portion 10 exhibiting a giant magnetoresistance effect for reproducing the magnetic signals stored in a magnetic medium. The magnetic sensing portion 10 comprises laminations of a free ferromagnetic layer 1, a non-magnetic metal layer 2, a pinned ferromagnetic layer 3, and an anti-ferromagnetic layer 4. The magnetization of the pinned ferromagnetic layer 3 is pinned in a direction "A" parallel to a direction of a signal magnetic field externally applied to the magnetoresistive head as illustrated in FIG. 3. The pinning force to pin the magnetization of the pinned ferromagnetic layer 3 is caused by an exchange coupling between the pinned ferromagnetic layer 3 and the anti-ferromagnetic layer 4. A static magnetic coupling is formed between the free and pinned ferromagnetic layers 1 and 3. A pair of permanent magnet layers 6 are provided at opposite sides of the above laminations distanced in a direction perpendicular to the above directions "A" and "B". The permanent magnet layers 6 provides a longitudinal bias magnetic field for forcing the free ferromagnetic layer 1 to be in a single domain state. A pair of terminals 5 are also provided on the permanent magnet layers 6 so that an initialization pulse current and a detection current are exclusively applied between the opposite sides of the laminations of the free ferromagnetic layer 1, the non-magnetic metal layer 2, the pinned ferromagnetic layer 3, and the anti-ferromagnetic layer 4, wherein the initialization pulse current flows in a direction "E" perpendicular to the above directions "A" and "B", whilst the detection current flows in a direction "C" anti-parallel to the direction "E" of the initialization pulse current. The initialization pulse current preferably has a pulse voltage level which is not less than three times as high as the voltage level of the detection current.

Materials of the free ferromagnetic layer 1, the non-magnetic metal layer 2 and the pinned ferromagnetic layer 3 may be selected so that the magnetic sensing portion 10 is capable of exhibiting a giant magnetoresistance effect. The material of the free and pinned ferromagnetic layers 1 and 3 may be selected from Fe, Co, Ni and alloys thereof. The material of the non-magnetic metal layer 2 may be selected from Cu, Ag, Au and alloys thereof. The material of the anti-ferromagnetic layer 4 may be selected form electrically conductive materials such as FeMn, NiMn, PtMn, CrMn and IrMn or electrically insulation materials such as nickel oxide, cobalt oxide and iron oxide.

Figure 4:
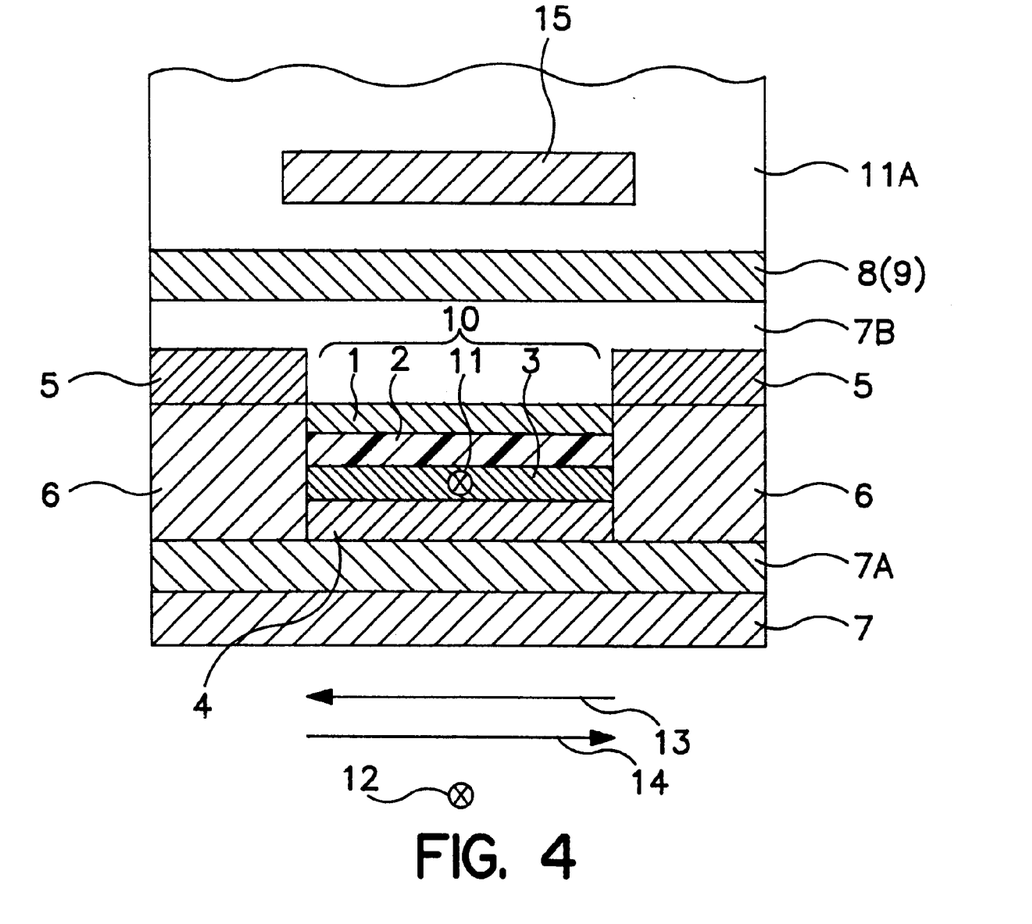
FIG. 4 is a fragmentary cross sectional elevation view illustrative of a novel magnetic sensing portion of a magnetoresistive head utilizing a giant magnetoresistive effect in first to third embodiments according to the present invention.

As illustrated in FIG. 4, the signal magnetic field is applied in the direction 12 and the magnetization of the pinned ferromagnetic layer 3 is pinned in the direction 11. Further, top and bottom shield layers 8 and 7 are provided for increase in the recording density in a bit direction. Top and bottom poles 15 and 9 are furthermore provided for recording magnetic signals into a magnetic medium. The other structures of the magnetoresistive head have already be described. The top shield layer 8 and the bottom pole 9 comprise a common single layer.

The above described magnetoresistive head may be formed as follows. An NiFe bottom shield layer 7 having a thickness of 2 micrometers is grown by a plating method on a ceramic non-magnetic substrate not illustrated. The NiFe bottom shield layer 7 is patterned by an ion milling method. An $Al_2O_3$ bottom shield gap layer 7A having a thickness of 0.1 micrometer is deposited on the NiFe bottom shield layer 7 by a sputtering method. An NiMn anti-ferromagnetic layer 4 having a thickness of 30 nanometers is deposited on the $Al_2O_3$ bottom shield gap layer 7A by a sputtering method. An NiFe ferromagnetic layer 3 having a thickness of 3 nanometers is deposited on the NiMn anti-ferromagnetic layer 4 by a sputtering method. A Cu non-magnetic metal layer 2 having a thickness of 2.5 nanometers is deposited on the NiFe ferromagnetic layer 3 by a sputtering method. An NiFe ferromagnetic layer 1 having a thickness of 6 nanometers is deposited on the Cu non-magnetic metal layer 2 by a sputtering method.

A magnetic field of 10 kOe is externally applied to the above laminations in the direction "B" of the signal magnetic field, during which the laminations are kept to be headed at 270° C. so as to apply an exchange magnetic field to the above laminations whereby the magnetization of the NiFe ferromagnetic layer 3 is pinned in the direction 11 in FIG. 4 or the direction "A" in FIG. 3.

The above laminations are provided with a stencil resist for subsequent ion-milling process to pattern the laminations at a width of 1.5 micrometers.

A pair of CoCrPt permanent magnet layers 6 having a thickness of 15 nanometers are deposited on the $Al_2O_3$ bottom shield gap layer 7A by a sputtering method using the above stencil resist so that the CoCrPt permanent magnet layers 6 are positioned at opposite sides of the above patterned laminations. Further, a pair of Au terminals 5 having a thickness of 0.2 micrometers are deposited on the CoCrPt permanent magnet layers 6 by a subsequent sputtering method using the above stencil resist. Thereafter, the used stencil resist is removed.

A magnetic field of 10 kOe is applied at atmospheric temperature to the above structure in a direction perpendicular to the direction 12 of the signal magnetic field for the purpose of polarization of the CoCrPt permanent magnet layers 6.

An $Al_2O_3$ top shield gap layer 7B having a thickness of 0.1 micrometer is then deposited by a sputtering method so that the $Al_2O_3$ top shield gap layer 7B covers the Au terminals 5 and the above patterned laminations. An NiFe top shield layer 8 having a thickness of 2 micrometers is then deposited on the $Al_2O_3$ top shield gap layer 7B by a plating method for subsequent pattering at a width of 60 micrometers by an ion milling.

An $Al_2O_3$ recording gap layer 11A having a thickness of 0.3 micrometers is formed on the NiFe top shield layer 8. A coil not illustrate is formed. Am NiFe top pole layer 15 having a thickness of 4 micrometers is formed.

Figure 5:
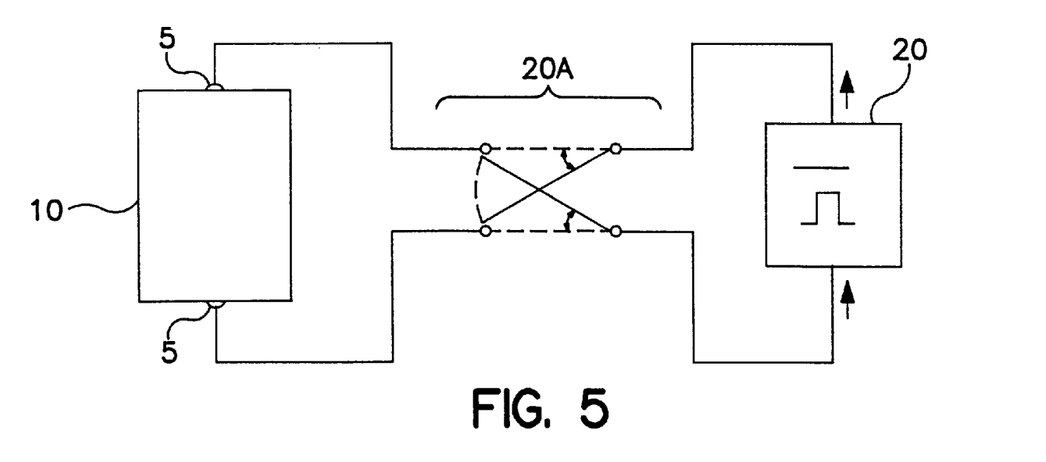
FIG. 5 is a block diagram illustrative of an initialization pulse current supply circuit used for initializing a novel magnetic sensing portion of a magnetoresistive head utilizing a giant magnetoresistive effect in a first embodiment according to the present invention.

As illustrated in FIG. 5, a device is provided for applying the initialization pulse current. The device 20 comprises a single pulse voltage generator 20 for generating a pulse current serving as the initialization pulse current, and a switching element 20A connected between the pulse voltage generator 20 and each of the paired terminals 5 of the magnetic sensing portion 10. The switching element 20A is operated to not only switch ON and OFF states of the pulse generator 20 by connecting and disconnecting the pulse generator 20 to and from the paired terminals 5 but also switch directions of applications of the pulse current so that the device is capable of both a detection current and the initialization pulse current anti-parallel to the detection current by operations of the switching element 20A. In this case, the single pulse voltage generator 20 is adjustable of a pulse voltage level so that the pulse voltage level of the initialization pulse current is not less than three times as high as the pulse voltage level of the detection current. A pulse duration of the applied initialization pulse voltage is set not more than 1 second in order to suppress undesired influences due to excess thermal generation.

There are opposite directions of the initialization pulse current which are perpendicular to the predetermined magnetization direction of the pinned ferromagnetic layer and also parallel to an interface between the pinned ferromagnetic layer and the non-magnetic metal layer. Notwithstanding, one of the opposite directions of the initialization pulse current is available for initialization of the magnetization. The available direction of the initialization pulse current is determined on the bases of the predetermined direction of the magnetization of the pinned ferromagnetic layer in accordance with Biot-Savart Law. As illustrated in FIG. 3, the magnetization of the pinned layer 3 is pinned in a direction of "A" by an exchange coupling between the pinned ferromagnetic layer and the anti-ferromagnetic layer. Even if the magnetization of the pinned ferromagnetic layer 3 has once been disturbed or disordered, it is possible to initialize the magnetoresistive transducer by re-pinning or re-ordering the magnetization of the pinned ferromagnetic layer in the predetermined magnetization direction "A", for which purpose the initialization pulse current is applied in a direction "E" across the opposite sides of the laminations of the pinned ferromagnetic layer 3, the non-magnetic metal layer 2 and the free ferromagnetic layer 1, wherein the direction "E" is determined on the bases of the predetermined magnetization direction "A" of the pinned ferromagnetic layer 3 in accordance with the Biot-Savart Law. The magnetization direction "A" of the pinned ferromagnetic layer 3 is pre-determined based upon a direction "B" of signal magnetic fields externally applied to the magnetoresistive transducer.

The above anti-ferromagnetic layer 4 may be made of either an electrically insulating anti-ferromagnetic material or an electrically conductive anti-ferromagnetic material. If the anti-ferromagnetic layer 4 is made of an electrically insulating anti-ferromagnetic material, then the initialization pulse current flows through the laminations of the free ferromagnetic layer 1, the non-magnetic metal layer 2 and the pinned ferromagnetic layer 3. On the other hand, if the anti-ferromagnetic layer 4 is made of an electrically conductive anti-ferromagnetic material, then the initialization pulse current flows through the laminations of the free ferromagnetic layer 1, the non-magnetic metal layer 2, the pinned ferromagnetic layer 3 and the anti-ferromagnetic layer 4, provided that the current density of the anti-ferromagnetic layer 4 is lower than the other three layers 1, 2 and 3.

A detection current flows through the laminations of the free ferromagnetic layer 1, the non-magnetic metal layer 2, the pinned ferromagnetic layer 3 and the anti-ferromagnetic layer 4, if the anti-ferromagnetic layer 4 is made of an electrically conductive anti-ferromagnetic material. If, however, the anti-ferromagnetic layer 4 is made of an electrically insulating anti-ferromagnetic material, then the detection current flows through the free ferromagnetic layer 1, the non-magnetic metal layer 2 and the pinned ferromagnetic layer 3. It is essential that the detection current flows in any direction parallel to the interface of the laminations of the above layers. Notwithstanding, it is preferable that a direction "C" of the detection current is perpendicular to the magnetization direction "A" of the pinned ferromagnetic layer 3 and also anti-parallel to the direction "E" of the initialization pulse current so that the magnetization direction of the free ferromagnetic layer 1 is perpendicular to the direction "B" of the externally applied signal magnetic field whereby a linear responsibility characteristic with a wide dynamic range can be obtained. The application of the detection current in the direction "C" anti-parallel to the initialization pulse current direction "E" causes the weakening of the pinning of the magnetization of the pinned ferromagnetic layer 3. As a result, the magnetization direction of the pinned ferromagnetic layer as disturbed or disordered. However, the application of the initialization pulse current in the direction "E" anti-parallel to the direction "C" of the detection current causes application of a current magnetic field in the same direction as the direction "A" of the original and ideal magnetization direction of the pinned ferromagnetic layer 3. Here, it is important that the pulse voltage level of the initialization pulse current is higher than the voltage level of the detection current. This application of a current magnetic field in the same direction as the direction "A" causes the pinning of the magnetization to be strong whereby the disturbed and disordered magnetization direction of the pinned ferromagnetic layer 3 is again ordered. As a result, the initialization of the magnetoresistive transducer can be realized. When the initialization pulse current is applied in the direction "E" prior to the application of the detection current in the direction "C", then the stability of the performance of the magnetoresistive transducer and the symmetrical and high reproduced waveform can be obtained.

Further, the magnetization direction of the pinned ferromagnetic layer 3 may be disturbed or disordered in processes for the magnetoresistive transducer, for example, the magnetoresistive head. Even if the magnetization direction of the pinned ferromagnetic layer 3 has been disturbed or disordered, it is possible to again initialize the magnetoresistive transducer by applying in the direction "E" the initialization pulse current having the pulse voltage level which is higher than the voltage level of the detection current as described above.

Second Embodiment

A second embodiment according to the present invention will be described in detail with reference to FIG. 6. This second embodiment is the same except for the device for applying the initialization pulse current. The following description will highlight on the difference between this second embodiment from the first embodiment.

Figure 6:
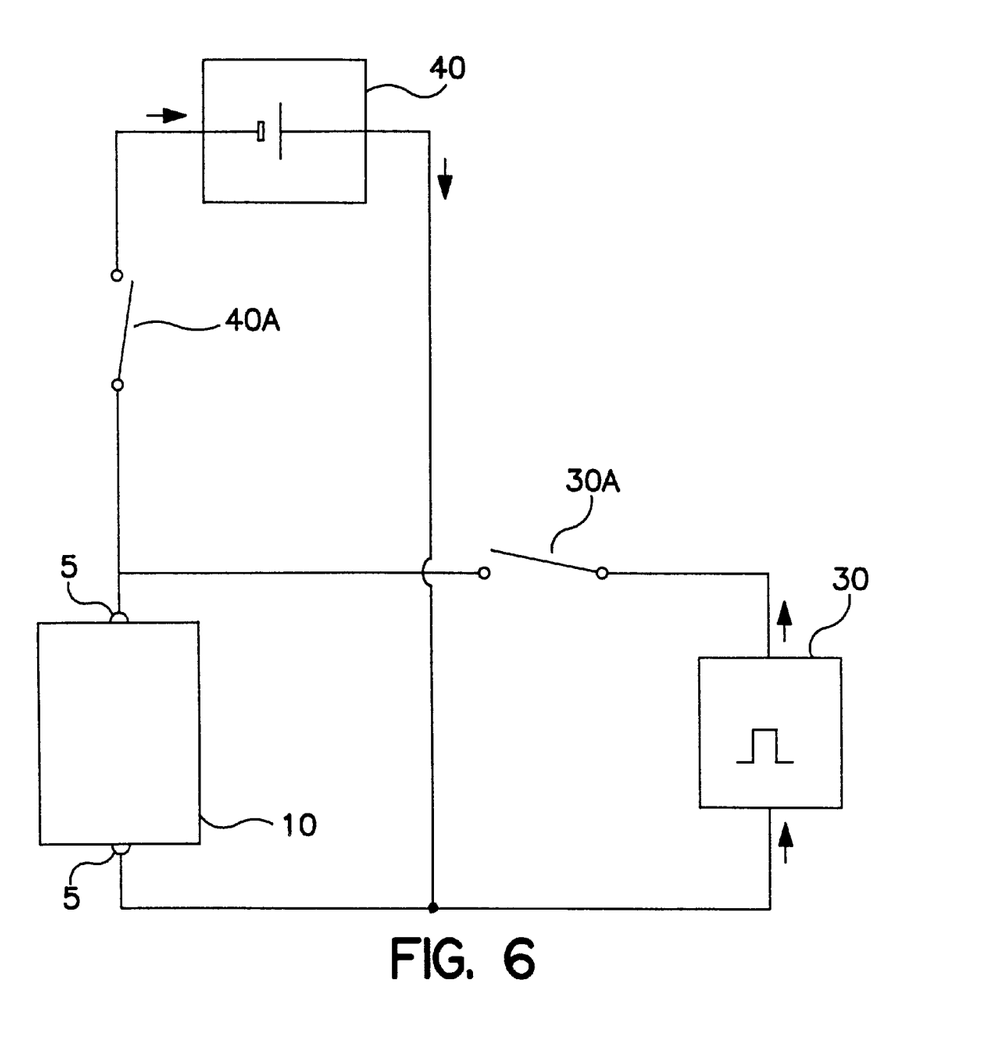
FIG. 6 is a block diagram illustrative of an initialization pulse current supply circuit used for initializing a novel magnetic sensing portion of a magnetoresistive head utilizing a giant magnetoresistive effect in a second embodiment according to the present invention.

As illustrated in FIG. 6, the device for applying the initialization pulse current comprises an initialization pulse current generator 30 and a detection current generator 40. The initialization pulse current generator 30 is connected via a first ON/OFF switch 30A to a pair of terminals 5 electrically connected to the magnetic sensing portion 10 for applying the pulse voltage between the opposite ends of the laminations to flow the initialization pulse current in the initialization pulse current direction through the laminations. The detection current generator 40 is electrically connected via a second ON/OFF switch 40A to the paired terminals 5 of the laminations of the magnetic sensing portion 10 for applying a voltage between the opposite ends of the laminations to flow a detection current in an anti-parallel direction to the initialization pulse current direction, wherein the first and second ON/OFF switches 30A and 40A are operated not to take the ON state concurrently. In this case, the initialization pulse current generator 30 is adjustable of a pulse voltage level of the initialization pulse current which is not less than three times as high as a pulse voltage level of the detection current adjusted by the detection current generator 40.

There are opposite directions of the initialization pulse current which are perpendicular to the predetermined magnetization direction of the pinned ferromagnetic layer and also parallel to an interface between the pinned ferromagnetic layer and the non-magnetic metal layer. Notwithstanding, one of the opposite directions of the initialization pulse current is available for initialization of the magnetization. The available direction of the initialization pulse current is determined on the bases of the predetermined direction of the magnetization of the pinned ferromagnetic layer in accordance with Biot-Savart Law. As illustrated in FIG. 3, the magnetization of the pinned layer 3 is pinned in a direction of "A" by an exchange coupling between the pinned ferromagnetic layer and the anti-ferromagnetic layer. Even if the magnetization of the pinned ferromagnetic layer 2 has once been disturbed or disordered, it is possible to initialize the magnetoresistive transducer by re-pinning or re-ordering the magnetization of the pinned ferromagnetic layer in the predetermined magnetization direction "A", for which purpose the initialization pulse current is applied in a direction "E" across the opposite sides of the laminations of the pinned ferromagnetic layer 3, the non-magnetic metal layer 2 and the free ferromagnetic magnetic layer 1, wherein the direction "E" is determined on the bases of the predetermined magnetization direction "A" of the pinned ferromagnetic layer 3 in accordance with the Biot-Savart Law. The magnetization direction "A" of the pinned ferromagnetic layer 3 is pre-determined based upon a direction "B" of signal magnetic fields externally applied to the magnetoresistive transducer.

The above anti-ferromagnetic layer 4 may be made of either an electrically insulating anti-ferromagnetic material or an electrically conductive anti-ferromagnetic material. If the anti-ferromagnetic layer 4 is made of an electrically insulating anti-ferromagnetic material, then the initialization pulse current flows through the laminations of the free ferromagnetic layer 1, the non-magnetic metal layer 2 and the pinned ferromagnetic layer 3. On the other hand, if the anti-ferromagnetic layer 4 is made of an electrically conductive anti-ferromagnetic material, then the initialization pulse current flows through the laminations of the free ferromagnetic layer 1, the non-magnetic metal layer 2, the pinned ferromagnetic layer 3 and the anti-ferromagnetic layer 4, provided that the current density of the anti-ferromagnetic layer 4 is lower than the other three layers 1, 2 and 3.

A detection current flows through the laminations of the free ferromagnetic layer 1, the non-magnetic metal layer 2, the pinned ferromagnetic layer 3 and the anti-ferromagnetic layer 4, if the anti-ferromagnetic layer 4 is made of an electrically conductive anti-ferromagnetic material. If, however, the anti-ferromagnetic layer 4 is made of an electrically insulating anti-ferromagnetic material, then the detection current flows through the free ferromagnetic layer 1, the non-magnetic metal layer 2 and the pinned ferromagnetic layer 3. It is essential that the detection current flows in any direction parallel to the interface of the laminations of the above layers. Notwithstanding, it is preferable that a direction "C" of the detection current is perpendicular to the magnetization direction "A" of the pinned ferromagnetic layer 3 and also anti-parallel to the direction "E" of the initialization pulse current so that the magnetization direction of the free ferromagnetic layer 1 is perpendicular to the direction "B" of the externally applied signal magnetic field whereby a linear responsibility characteristic with a wide dynamic range can be obtained. The application of the detection current in the direction "C" anti-parallel to the initialization pulse current direction "E" causes the weakening of the pinning of the magnetization of the pinned ferromagnetic layer 3. As a result, the magnetization direction of the pinned ferromagnetic layer is disturbed or disordered. However, the application of the initialization pulse current in the direction "E" anti-parallel to the direction "C" of the detection current causes application of a current magnetic field in the same direction as the direction "A" of the original and ideal magnetization direction of the pinned ferromagnetic layer 3. Here, it is important that the pulse voltage level of the initialization pulse current is higher than the voltage level of the detection current. This application of a current magnetic field in the same direction as the direction "A" causes the pinning of the magnetization to be strong whereby the disturbed and disordered magnetization direction of the pinned ferromagnetic layer 3 is again ordered. As a result, the initialization of the magnetoresistive transducer can be realized. When the initialization pulse current is applied in the direction "E" prior to the application of the detection current in the direction "C", then the stability of the performance of the magnetoresistive transducer and the symmetrical and high reproduced waveform can be obtained.

Further, the magnetization direction of the pinned ferromagnetic layer 3 may be disturbed or disordered in processes for the magnetoresistive transducer, for example, the magnetoresistive head. Even if the magnetization direction of the pinned ferromagnetic layer 3 has been disturbed or disordered, it is possible to again initialize the magnetoresistive transducer by applying in the direction "E" the initialization pulse current having the pulse voltage level which is higher than the voltage level of the detection current as described above.

Third Embodiment

A third embodiment according to the present invention will be described in detail with reference to FIG. 7. This third embodiment is the same except for the device for applying the initialization pulse current. The following description will highlight on the difference between this third embodiment from the first embodiment.

Figure 7:
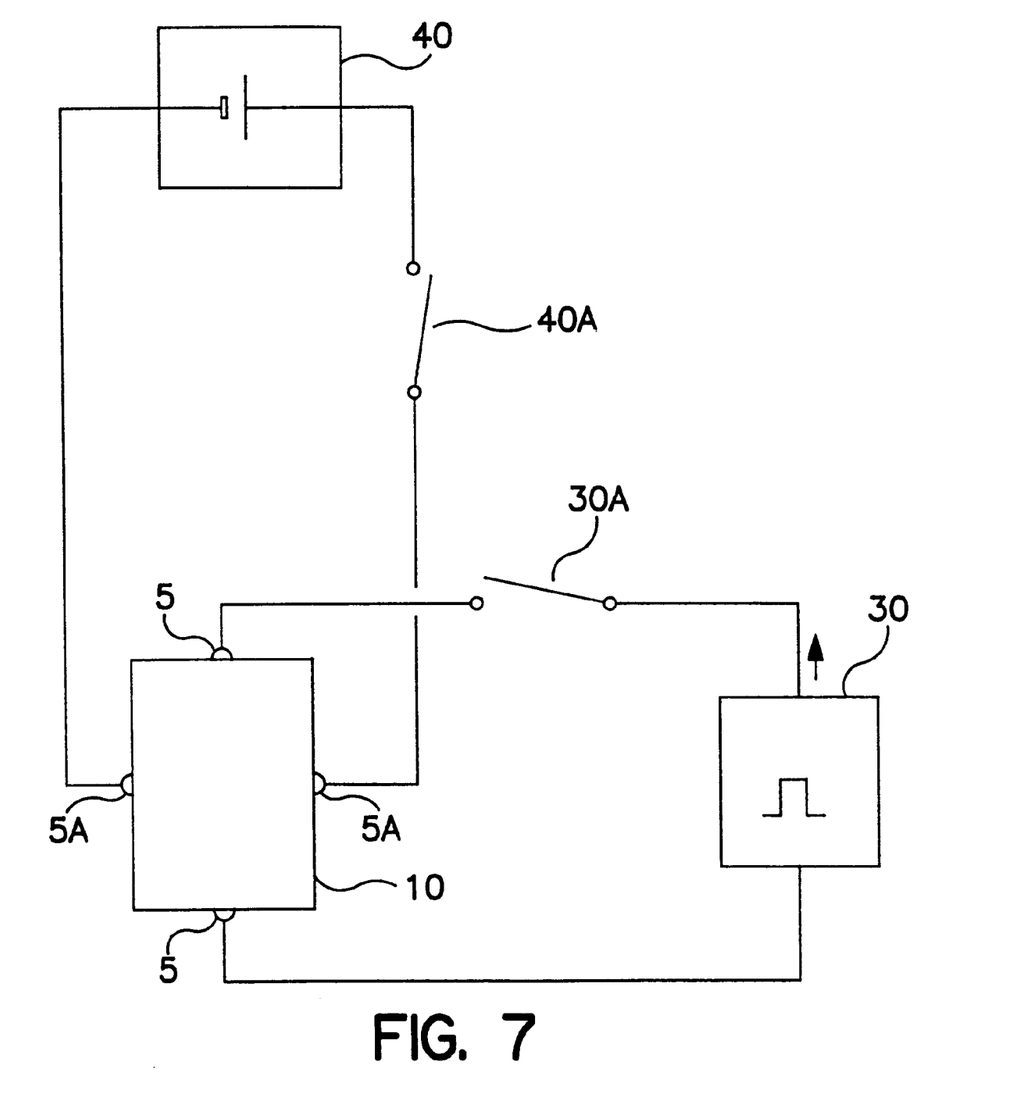
FIG. 7 is a block diagram illustrative of an initialization pulse current supply circuit used for initializing a novel magnetic sensing portion of a magnetoresistive head utilizing a giant magnetoresistive effect in a third embodiment according to the present invention.

As illustrated in FIG. 7, the device comprises an initialization pulse current generator 30 and a detection current generator 40. The initialization pulse current generator 30 is electrically connected via a first ON/OFF switch 30A to a pair of first terminals 5 electrically connected to the magnetic sensing portion 10 for applying the pulse voltage between the opposite ends of the laminations of the magnetic sensing portion 10 to flow the initialization pulse current in the initialization pulse current direction though the laminations. The detection current generator 40 is electrically connected via a second ON/OFF switch 40A to a pair of second terminals 5A electrically connected to other opposite ends of the laminations of the magnetic sensing portion 10 than the above opposite ends thereof for applying a voltage between the second terminals 5A to flow a detection current between the other opposite ends of the laminations, wherein the first and second ON/OFF switches 30A and 40A are operated not to take the ON state concurrently. In this case, the initialization pulse current generator is adjustable of a pulse voltage level of the initialization pulse current being not less than three times as high as a pulse voltage level of the detection current adjusted by the detection current generator.

There are opposite directions of the initialization pulse current which are perpendicular to the predetermined magnetization direction of the pinned ferromagnetic layer and also parallel to an interface between the pinned ferromagnetic layer and the non-magnetic metal layer. Notwithstanding, one of the opposite directions of the initialization pulse current is available for initialization of the magnetization. The available direction of the initialization pulse current is determined on the bases of the predetermined direction of the magnetization of the pinned ferromagnetic layer in accordance with Biot-Savart Law. As illustrated in FIG. 3, the magnetization of the pinned layer 3 is pinned in a direction of "A" by an exchange coupling between the pinned ferromagnetic layer and the anti-ferromagnetic layer. Even if the magnetization of the pinned ferromagnetic layer 3 has once been disturbed or disordered, it is possible to initialize the magnetoresistive transducer by re-pinning or re-ordering the magnetization of the pinned ferromagnetic layer in the predetermined magnetization direction "A", for which purpose the initialization pulse current is applied in a direction "E" across the opposite sides of the laminations of the pinned ferromagnetic layer 3, the non-magnetic metal layer 2 and the free ferromagnetic magnetic layer 1, wherein the direction "E" is determined on the bases of the predetermined magnetization direction "A" of the pinned ferromagnetic layer 3 in accordance with the Biot-Savart Law. The magnetization direction "A" of the pinned ferromagnetic layer 3 is pre-determined based upon a direction "B" of signal magnetic fields externally applied to the magnetoresistive transducer.

The above anti-ferromagnetic layer 4 may be made of either an electrically insulating anti-ferromagnetic material or an electrically conductive anti-ferromagnetic material. If the anti-ferromagnetic layer 4 is made of an electrically insulating anti-ferromagnetic material, then the initialization pulse current flows through the laminations of the free ferromagnetic layer 1, the non-magnetic metal layer 2 and the pinned ferromagnetic layer 3. On the other hand, if the anti-ferromagnetic layer 4 is made of an electrically conductive anti-ferromagnetic material, then the initialization pulse current flows through the laminations of the free ferromagnetic layer 1, the non-magnetic metal layer 2, the pinned ferromagnetic layer 3 and the anti-ferromagnetic layer 4, provided that the current density of the anti-ferromagnetic layer 4 is lower than the other three layers 1, 2 and 3.

A detection current flows through the laminations of the free ferromagnetic layer 1, the non-magnetic metal layer 2, the pinned ferromagnetic layer 3 and the anti-ferromagnetic layer 4, if the anti-ferromagnetic layer 4 is made of an electrically conductive anti-ferromagnetic material. If, however, the anti-ferromagnetic layer 4 is made of an electrically insulating anti-ferromagnetic material, then the detection current flows through the free ferromagnetic layer 1, the non-magnetic metal layer 2 and the pinned ferromagnetic layer 3. It is essential that the detection current flows in any direction parallel to the interface of the laminations of the above layers. Notwithstanding, it is preferable that a direction "C" of the detection current is perpendicular to the magnetization direction "A" of the pinned ferromagnetic layer 3 and also anti-parallel to the direction "E" of the initialization pulse current so that the magnetization direction of the free ferromagnetic layer 1 is perpendicular to the direction "B" of the externally applied signal magnetic field whereby a linear responsibility characteristic with a wide dynamic range can be obtained. The application of the detection current in the direction "C" anti-parallel to the initialization pulse current direction "E" causes the weakening of the pinning of the magnetization of the pinned ferromagnetic layer 3. As a result, the magnetization direction of the pinned ferromagnetic layer is disturbed or disordered. However, the application of the initialization pulse current in the direction "E" anti-parallel to the direction "C" of the detection current causes application of a current magnetic field in the same direction as the direction "A" of the original and ideal magnetization direction of the pinned ferromagnetic layer 3. Here, it is important that the pulse voltage level of the initialization pulse current is higher than the voltage level of the detection current. This application of a current magnetic field in the same direction as the direction "A" causes the pinning of the magnetization to be strong whereby the disturbed and disordered magnetization direction of the pinned ferromagnetic layer 3 is again ordered. As a result, the initialization of the magnetoresistive transducer can be realized. When the initialization pulse current is applied in the direction "E" prior to the application of the detection current in the direction "C", then the stability of the performance of the magnetoresistive transducer and the symmetrical and high reproduced waveform can be obtained.

Further, the magnetization direction of the pinned ferromagnetic layer 3 may be disturbed or disordered in processes for the magnetoresistive transducer, for example, the magnetoresistive head. Even if the magnetization direction of the pinned ferromagnetic layer 3 has been disturbed or disordered, it is possible to again initialize the magnetoresistive transducer by applying in the direction "E" the initialization pulse current having the pulse voltage level which is higher than the voltage level of the detection current as described above.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A device for supplying an initialization pulse current to at least laminations of a pinned ferromagnetic layer, a non-magnetic metal layer and a free ferromagnetic layer in a magnetoresistive transducer in an initialization pulse current direction which is perpendicular to a predetermined magnetization direction of said pinned ferromagnetic layer and also parallel to an interface between the pinned ferromagnetic layer and the non-magnetic metal layer, wherein said device comprises an initialization pulse current generator electrically connected via a first ON/OFF switch to a pair of terminals electrically connected to opposite ends of said laminations for applying a pulse voltage between said opposite ends of said laminations to flow the initialization pulse current in said initialization pulse current direction through said laminations; and a detection current generator electrically connected via a second ON/OFF switch to said paired terminals for applying a voltage between said opposite ends of said laminations to flow a detection current in an anti-parallel direction to said initialization pulse current direction, wherein said first and second ON/OFF switches are operated not to take the ON state concurrently.

2. The device as claimed in claim 1, wherein a pulse duration of said pulse voltage is set not more than 1 second.

3. The device as claimed in claim 1, wherein said initialization pulse current generator is adjustable of a pulse voltage level of said initialization pulse current being not less than three times as high as a pulse voltage level of said detection current adjusted by said detection current generator.

4. The device as claimed in claim 1, wherein said laminations further include an anti-ferromagnetic layer which is in contact with said pinned ferromagnetic layer and said anti-ferromagnetic layer is made of an insulation material so that said initialization pulse current flows through said pinned ferromagnetic layer, said non-magnetic metal layer and said free ferromagnetic layer.

5. The device as claimed in claim 1, wherein said laminations further include an anti-ferromagnetic layer which is in contact with said pinned ferromagnetic layer and said anti-ferromagnetic layer is made of a conductive material so that said initialization pulse current flows through said pinned ferromagnetic layer, said non-magnetic metal layer, said free ferromagnetic layer and said anti-ferromagnetic layer.

6. A device for supplying an initialization pulse current to at least laminations of a pinned ferromagnetic layer, a non-magnetic metal layer and a free ferromagnetic layer in a magnetoresistive transducer in an initialization pulse current direction which is perpendicular to a predetermined magnetization direction of said pinned ferromagnetic layer and also parallel to an interface between the pinned ferromagnetic layer and the non-magnetic metal layer wherein said device comprises:

an initialization pulse current generator electrically connected via a first ON/OFF switch to a pair of terminals electrically connected to opposite ends of said laminations for applying a pulse voltage between said opposite ends of said laminations to flow the initialization pulse current in said initialization pulse current direction through said laminations; and a detection current generator electrically connected via a second ON/OFF switch to other terminals electrically connected to other opposite ends of said laminations than said opposite ends thereof for applying a voltage between said other opposite ends of said laminations to flow a detection current between said other opposite ends of said laminations, wherein said first and second ON/OFF switches are operated not to take the ON state concurrently.

7. The device as claimed in claim 6, wherein said initialization pulse current generator is adjustable of a pulse voltage level of said initialization pulse current being not less than three times as high as a pulse voltage level of said detection current adjusted by said detection current generator.

* * * * *

UNITED STATES PATENT AND TRADEMARK OFFICE
CERTIFICATE OF CORRECTION

PATENT NO.     : 6,028,730
DATED          : February 22, 2000
INVENTOR(S)    : Kunihiko Ishihara It is certified that error appears in the above-identified patent and that said Letters Patent is hereby corrected as shown below:

Column 20, claim 5,
Line 44, change "a" to -- the --.

Signed and Sealed this

Nineteenth Day of February, 2002

Attest:

JAMES E. ROGAN
Attesting Officer     Director of the United States Patent and Trademark Office